United States Patent [19]

Egner-Walter et al.

[11] Patent Number: 4,729,145

[45] Date of Patent: Mar. 8, 1988

[54] DEVICE, ESPECIALLY RECIPROCATING WIPER SYSTEM FOR MOTOR VEHICLES

[75] Inventors: Bruno Egner-Walter, Heilbronn; Eckhardt Schmid, Brackenheim; Wolfgang Scholl, Gemmrigheim, all of Fed. Rep. of Germany

[73] Assignee: SWF Auto-Electric GmbH, Bietigheim-Bissingen, Fed. Rep. of Germany

[21] Appl. No.: 802,695

[22] Filed: Nov. 27, 1985

[30] Foreign Application Priority Data

Nov. 30, 1984 [DE] Fed. Rep. of Germany ....... 3443750

[51] Int. Cl.⁴ .................. B60S 1/24; F16C 23/04; F16C 29/02
[52] U.S. Cl. ............... 15/250.21; 15/250.23; 384/16; 384/29; 384/38; 384/42
[58] Field of Search ............ 384/7, 15, 16, 26, 29-31, 384/38, 152, 42, 153, 32, 40, 13, 137, 138, 206, 208, 214; 15/250.21, 250.23; 74/44; 277/30, 100, 97, 152, 153

[56] References Cited

U.S. PATENT DOCUMENTS

| | | | |
|---|---|---|---|
| 2,808,277 | 10/1957 | Binder | 384/16 |
| 3,001,808 | 9/1961 | Frye | 384/16 |
| 3,224,817 | 12/1965 | Miller et al. | 384/16 |
| 3,556,617 | 1/1971 | Axthammer et al. | 384/16 |
| 4,048,370 | 9/1977 | Orkin et al. | 384/909 |
| 4,132,415 | 1/1979 | Langford | 384/137 X |

FOREIGN PATENT DOCUMENTS

| | | | |
|---|---|---|---|
| 1331802 | 5/1963 | Australia | 384/206 |
| 773870 | 5/1957 | United Kingdom | 277/100 |

*Primary Examiner*—David Werner
*Attorney, Agent, or Firm*—James B. Raden; William J. Michals

[57] ABSTRACT

In a reciprocating wiper system for motor vehicles a piston is linearly displaceably guided in a housing and mounted in a bearing which is seated in a receptacle of the housing. A scraper ring and a sealing ring intended to clean the piston are positioned in front of the bearing. The sealing ring and the scraper ring are jointly mounted in the housing with the bearing as a structural unit. In a preferred embodiment the sealing ring and the scraper ring are held on a universal ball joint being part of the bearing.

6 Claims, 9 Drawing Figures

DEVICE, ESPECIALLY RECIPROCATING WIPER SYSTEM FOR MOTOR VEHICLES

BACKGROUND OF THE INVENTION

The invention pertains to a reciprocating wiper system for motor vehicles.

Such a wiping system includes a housing, a piston, which is linearly displaceably guided in the housing and mounted in a bearing seated in a receptacle of the housing, and further includes a sealing ring and/or a scraper ring for the piston.

The sealing ring prevents liquid from entering into the housing interior at the bearing, especially between bearing and piston. The scraper ring scrapes off or breaks off ice which sticks to the piston, so that it cannot damage the sealing ring and the bearing. Thus the scraper ring is positioned in front of the sealing ring.

In a reciprocating wiper system it has been suggested to separately insert the bearing or the various rings into the housing.

SUMMARY OF THE INVENTION

It is one object of the present invention to improve the mounting of the bearing and of the various rings on the housing and the cleaning of the piston in a reciprocating wiper system for motor vehicles.

In a reciprocating wiper system for motor vehicles a piston is linearly displaceably guided in a housing and mounted in a bearing which is seated in a receptacle of the housing. A scraper ring and a sealing ring intended to clean the piston are positioned in front of the bearing. The sealing ring and the scraper ring are jointly mounted in the housing with the bearing as a structural unit. In a preferred embodiment the sealing ring and the scraper ring are held on a universal ball joint being part of the bearing. Thereby mounting is considerably simplified, because the parts are at first brought into the proper position relative to each other while they are easily accessible and can then be inserted together. Faulty mounting can be more easily prevented, so that the cleaning effect of the ring or of the rings is better ensured. Because the sealing ring and/or the scraper ring are arranged closer to the bearing, the scraper ring position with regard to the piston is no longer affected by tolerances in the dimensions of the housing. The cleaning of the piston is thereby also improved.

It is especially advantageous when the sealing ring, scraper ring and lubricating felt are secured on the bearing in the axial and radial direction independently of the housing. The bearing and the additional parts thereby form a compact structural unit when mounted on each other. The structural unit does not need to be held together from outside. This compact structural unit can especially easily be inserted in the housing. Advantageously the sealing ring is axially held between the bearing and the scraper ring. Thus bearing and scraper ring jointly secure the sealing ring. The scraper ring itself can be mounted on the bearing in a usual way.

The bearing may have a bearing ring which is self-adjusting with regard to the piston, especially a universal ball joint. It is advantageous if the sealing ring and/or the scraper ring are movable conformally with the bearing ring. It is thereby ensured that the sealing lip of the sealing ring always rests against the piston in the same way independently of the momentary position of the piston and thus always fulfills its function. If a scraper ring is available it also always retains its position with regard to the piston.

The bearing may have an inner bearing ring, especially a universal ball joint, and an outer bearing ring, especially consisting of plastics material, which is seated in the housing. The outer bearing ring may advantageously be injection-molded about the inner bearing ring. However it is also favorable to develop the outer bearing ring in such a way that the universal ball joint can be snapped into it. The outer bearing ring can also be composed of two halves separated in an axial plane. To reduce the number of piece parts the two halves may be connected by a film hinge and injection-molded in the unfolded position. The cap-shaped bearing can then be inserted in one half of the outer bearing and the latter can then be completed. To simplify production assembly, the sealing ring and/or the scraper ring and lubricating felt if needed are held by the other bearing ring. If the latter is composed of two halves the additional parts can also be easily inserted in one half. On the other hand, when the outer bearing ring is formed in such a way, the scraper ring can also be formed on the outer bearing ring as a single piece, because an undercut behind the scraper ring can then in a simple way be produced in the outer bearing ring.

It is advantageous, if the receptacle of the housing has a conical shape and narrows towards the interior and if the outer bearing ring has a corresponding conical form. The cone in the housing permits removal of the receptacle from its form without damage when the housing is produced. Because the outer bearing ring is also conical the bearing receptacle need not be treated in any way before the bearing is mounted. This would be necessary, for example, if the outer bearing ring would be cylindrical. Moreover the position of the bearing in the axial direction is secured by the cone without an additional stop in the housing.

One bearing ring, the inner or the outer one, may have a collar extending in the axial direction. This arrangement is especially favorable for holding the sealing ring and/or the scraper ring. The scraper ring is advantageously fastened outside on the collar, while the sealing ring is positioned between the collar and the piston. The collar of a universal ball joint can be formed on a cylindrical bearing bush which is inserted in the universal ball joint. The scraper ring has preferably a planar radial metal ring and a plastics ring which is injection-molded about the metal ring. The metal ring is hard enough to scrape off solid substances from the piston and the plastics ring is of advantage to connect the scraper ring with a bearing ring. Advantageously the plastics ring secures the sealing ring in one axial direction.

BRIEF DESCRIPTION OF THE DRAWING

The invention will be better understood from a reading of the following detailed description in conjunction with the drawing in which.

DETAILED DESCRIPTION

Figure 1:
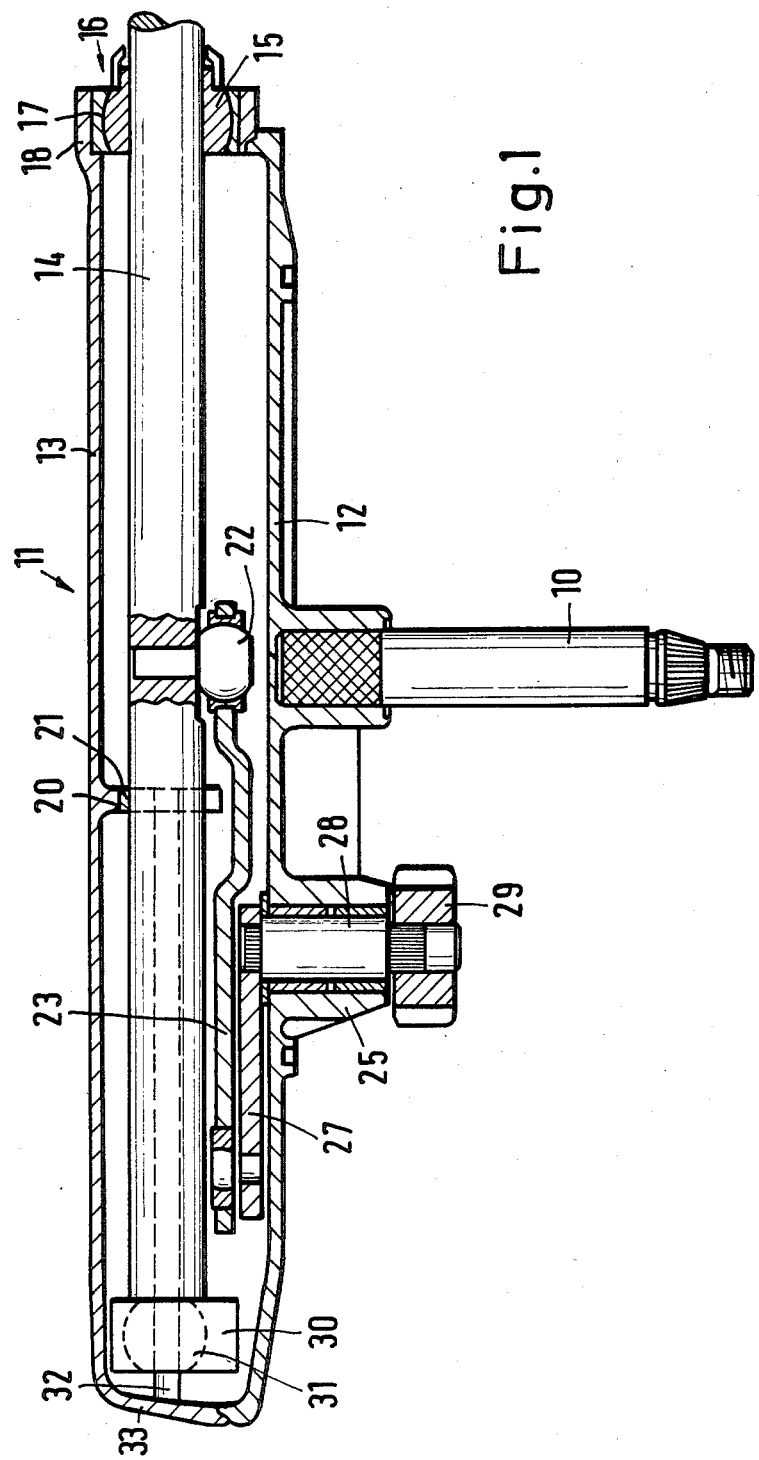
FIG. 1 is a longitudinal section through the housing of a reciprocating wiper system which housing may be driven in pendulum fashion via a wiper shaft and in which is mounted a longitudinally displaceable piston.

In the reciprocating wiper system shown in FIG. 1 a housing 11 is secured on a wiper shaft 10 in a manner protected against twisting. Housing 11 is part of the wiper arm and consists of two component parts, namely a base plate 12 and a cover 13. Within the housing 11, a piston 14 is supported in a universal ball joint 15 of a capshaped bearing 16. The universal ball joint 15 is positioned in an outer bearing ring 17 as an inner bearing ring. Outer bearing ring 17 is inserted in the receptacle 18 of the cover 13. However the receptacle 18 can also be positioned on the base plate 12 of the housing. The universal ball joint 15 is swivellable about two axes in the outer bearing ring 17. The two swivel axes are perpendicular to each other and the longitudinal direction of the piston. There is a transverse wall 20 spaced from cap-shaped bearing 16 and projects from cover 13 to the interior of the housing. Wall 20 has a central bore 21 through which piston 14 freely extends.

Between transverse wall 20 and bearing 16 a coupling rod 23 is fastened on the piston 14 via a ball pin 22. The other end of coupling rod 23 is articulated to the free end of a crank 27. Crank 27 is secured on a shaft 28 in a manner protected against twisting. Shaft 28 is mounted in a sleeve 25 of base plate 12, projects beyond this base plate and in a manner protected against twisting carries a toothed wheel 29. Toothed wheel 29 is turned during the to-and-fro movement of the housing 11. Its rotation is transformed into a to-and-fro movement of the piston 14 via the crank mechanism.

At the rear end of piston 14 a slide 30 is held in a manner protected against twisting and extends into two opposite sides of piston 14. Slide 30 is made of plastic material and is directly injection-molded on a grooved portion of the piston 14. At the same spacing from the piston 14 the slide 30 has a cap-shaped bearing 31 on each side. Slide 30 is longitudinally guided on two cylindric guide columns 32 arranged in parallel to each other and inserted through bores in the transverse wall 20 and in the front face 33 of the cover 13 at the rear end and fastened by force-fitting. Thus piston 14 is supported in housing 11 in such a way that the piston 14 is movable to and fro in the radial direction relative to the wiper shaft.

Figure 2:
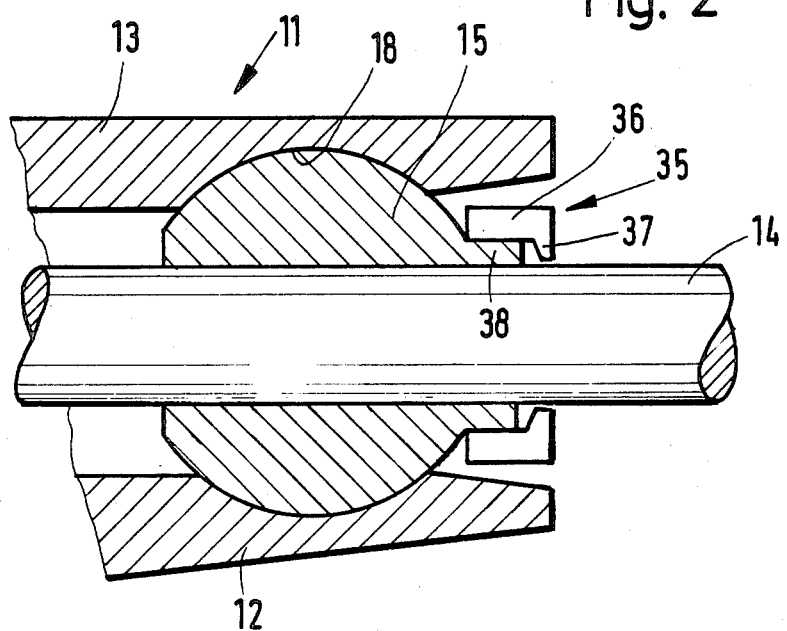
FIGS. 2 and 2a show two separate embodiments of a cap-shaped bearing with a scraper ring for the piston fixed on a universal ball joint at an enlarged scale as compared with FIG. 1.

FIG. 2 illustrates one embodiment of the invention. To protect cap-shaped bearing 16 from being damaged and to prevent solid matter, e.g. ice, from slipping between piston 14 and universal ball joint 15, the piston 14, is surrounded by a scraper ring 35 outside the bearing 16. Scraper ring 35 can consist of a metallic material and has a cylindrical portion 36. An internal flange 37 directed towards the piston 14 is provided on one front face of the cylindrical portion 36. Scraper ring 35 is pressed or glued onto collar 38 of the universal ball joint 15 and positioned directly outside the piston 14. Universal ball joint 15 is directly seated in a corresponding receptacle 18 of the housing 11 and can swivel about two axes standing perpendicular to each other and on the axis of the piston 14 and can thus adjust itself to each position of the piston 14. Because scraper ring 35 is mounted on the universal ball joint 15 it is moved together with universal ball joint 15 and thus always retains its position with regard to the piston 14. The cleaning effect of the scraper ring is therefore particularly effective.

Figure 2A:
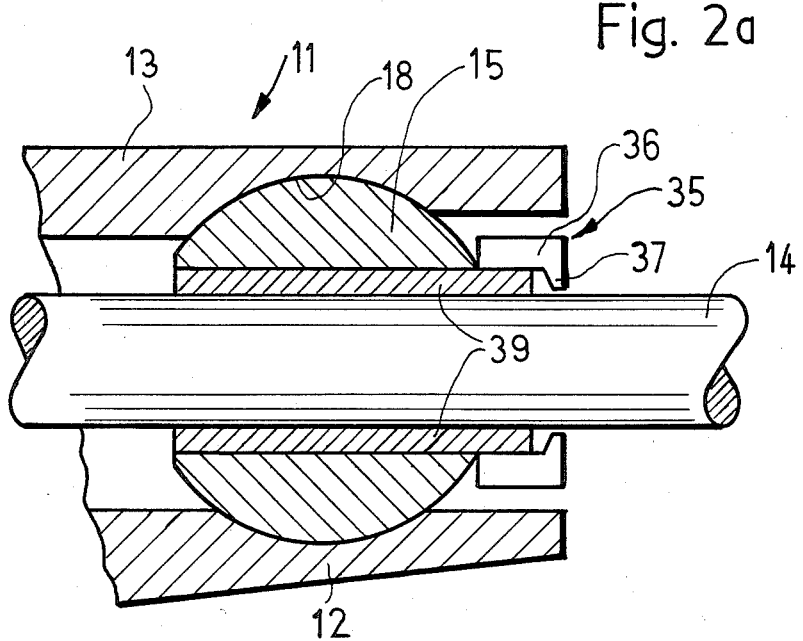

In a second embodiment shown FIG. 2a the collar 38 is a portion of a cylindrical bearing bushing 39 projecting beyond the universal ball joint and inserted between the piston 14 and the universal ball joint 15. With this arrangement the universal ball joint 15 may be made of a material not having as good bearing properties as that of the previous embodiment.

Figure 3:
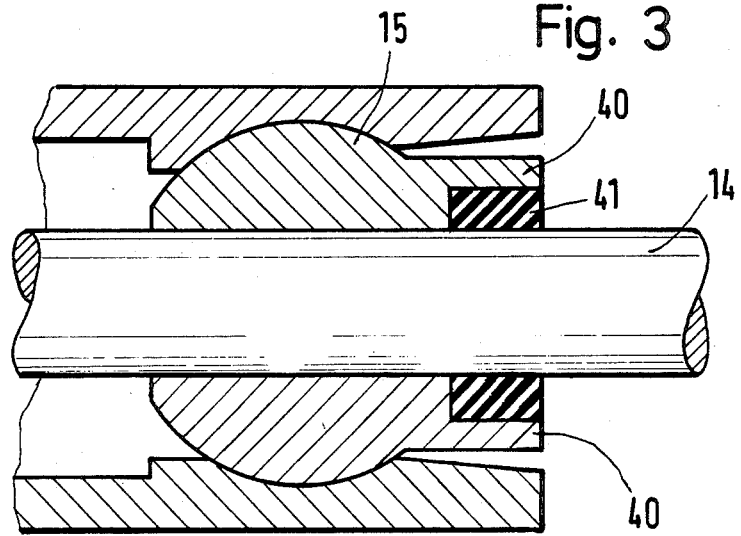
FIGS. 3 and 3a show two additional separate embodiments of a cap-shaped bearing with a sealing ring held on the universal ball joint.
Figure 3A:
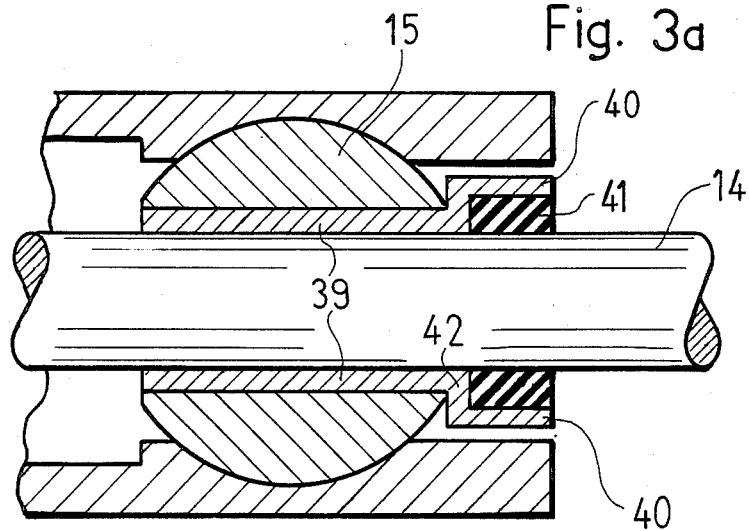

In the embodiment according to FIG. 2 the scraper ring 35 is mounted outside on collar 38. In FIGS. 3 and 3a two embodiments are shown in which an axially extending collar 40 is spaced from the piston 14. Thereby an annular duct is formed between the piston 14 and the collar 40. A sealing ring 41 is inserted in this annular duct and touches the inside of the collar 40. In the embodiment of 3a the collar 40 is again directly formed on the universal ball joint 15. In the second example according to FIG. 3a, a bearing bushing 39 is positioned between the universal ball joint 15 and the piston 14. The bearing bushing has a radial flange 42 outside the universal ball joint 15, from which flange collar 40 projects axially.

Figure 4:
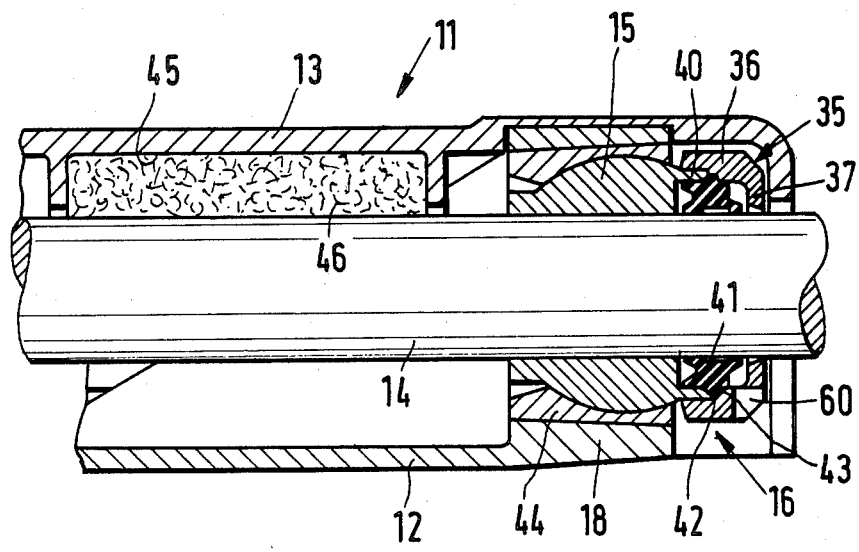
FIG. 4 shows a sealing ring and a scraper ring held on a universal ball joint of a bearing.

FIG. 4 shows a bearing 16 with a scraper ring 35 and a sealing ring 41. Both rings are again movable conformally with the universal ball joint 15. An axial collar 40 is formed onto the universal ball joint 15 at a spacing from the piston 14. Scraper ring 35 is mounted outside on collar 40 with its cylindrical portion 36. A portion 37 of scraper ring 35 points to piston 14. In front of collar 40 in the radial direction towards piston 14 the cylindric portion 36 of the scraper ring 35 becomes thicker in two steps. At the first step it hits the front side of the collar 40. The second step and collar 40 form an annular groove 42 which receives an external rib 43 of sealing ring 41. Thus sealing ring 41 is axially secured between universal ball joint 15 and scraper ring 35.

The bearing 16 of FIG. 4 has an external ring 44 and an internal ring, as which the universal ball joint 15 has to be regarded. The external ring 44 made of plastics material is directly injection-molded about the universal ball joint 15 in such a way that it is swivellable and can adjust itself to any position of the piston 14. Before bearing 16 is mounted in the housing 11, the scraper ring 35 and sealing ring 41 can be fastened on the bearing 16. Then they can be inserted into the receptacle 18 of the housing 11 as a structural unit.

In the embodiment according to FIG. 4 a receptacle 18 is positioned at the base plate 12 of housing 11. The inside of this receptacle is slightly conical and narrows towards the housing interior. External ring 44 has the same conical form, so that it exactly fits into the receptacle 18. This conical form determines a certain path on which the structural unit is pushed into the receptacle 18. The conicalform thus effects a stop in one axial direction. External ring 44 is glued into the receptacle, so that a firm seat is ensured in any axial direction.

Behind bearing 16 in a chamber 45 of cover 13 there is a lubricating felt 46 which rests upon the piston 14.

In front of the sealing ring 54 and of receptacle 18 there is an opening 60 in the plastic ring 57 which leads radially to the outside. Opening 60 is a drain hole for liquid, in particular water, which comes between the scraper ring 53 and the piston 14 into the space between scraper ring 53 and sealing ring 54 and is wiped off from the sealing ring 54 by the piston 14. The embodiment of FIG. 4 also includes a drawing opening 60. In this manner the effectiveness of the sealing ring 41 or 54 is not affected by the scraper ring 35 or 53.

Figure 5:
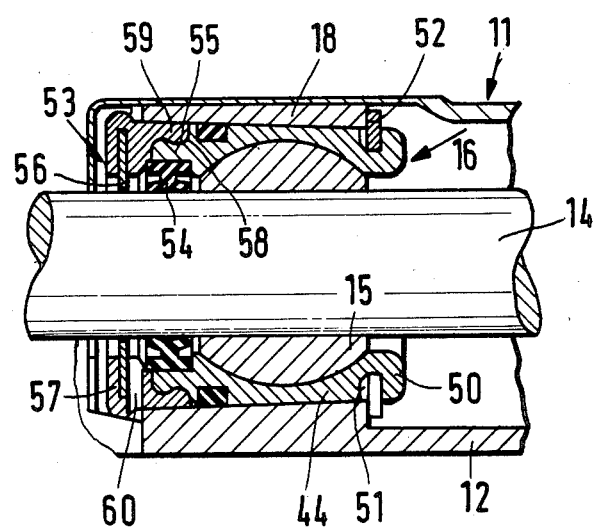
FIG. 5 is a bearing with an inner bearing ring in the shape of a universal ball joint and an outer bearing ring on which the sealing ring and the scraper ring are fastened.

In the embodiment of FIG. 5, bearing 16 also has a universal ball joint 15 as an internal ring and an external ring 44. The latter is again fitted in a conical receptacle 18 of the base plate 12. External ring 44 has a portion 50 which projects axially beyond receptacle 18 into the interior of the housing 11. Portion 50 has a radial annular groove 51, into which a U-yoke 52 is pushed in to in the radial direction. U-yoke 52 rests against the outside of external ring 44 at the front side of receptacle 18 and against the front face of annular groove 51 and thus secures the bearing 16 in one axial direction. A fixed position with regard to the other axial direction is provided by the conical form of receptacle 18 and external ring 44.

A scraper ring 53 and a sealing ring 54 are held at the external ring 44 of bearing 16. External ring 44 has a collar 55 which extends in the axial direction of piston 14 and is radially spaced from it. The scraper ring is again fixed to the outside of the collar 55, while the sealing ring 54 is positioned between the collar 55 and the piston 14. The scraper ring is composed of a disk-shaped, radially extending metal ring 56 having a central passage for the piston 14 and a plastic ring 57 injection-molded about the metal ring 56 and with a cylindric portion extending in parallel to the collar 55. Collar 55 has an undercut 58 into which plastic ring 57 snaps with an appropriate projection. When the structural unit is mounted the cylindric and outwardly slightly conical portion 59 of the plastics ring 57 rests against receptacle 18 of housing 11. It can not therefore be drawn off collar 55. Sealing ring 54 is axially positioned between external ring 44 of bearing 16 and plastic ring 57 and is thus secured in both axial directions.

Figure 6:
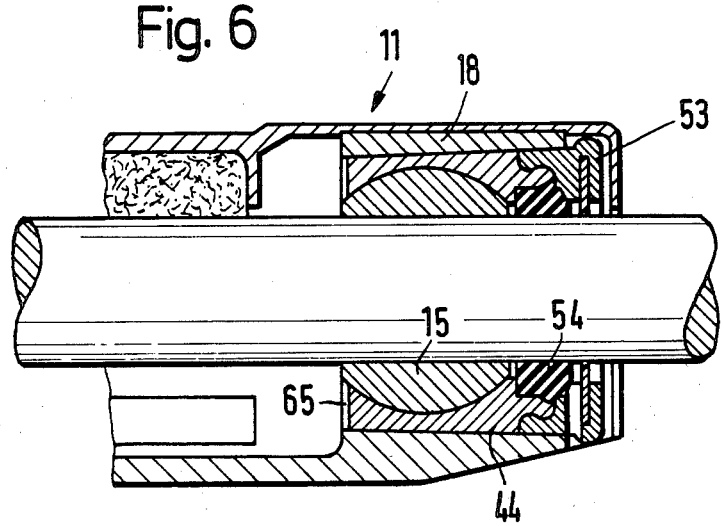
FIG. 6 shows an embodiment similar to that of FIG. 5 in which the outer bearing ring is on the receptacle of the housing.

The embodiment of FIG. 6 utilizes the same scraper ring 53 as in the embodiment of FIG. 5. Sealing ring 54 differs slightly from that of FIG. 5, however it is held in the same way between external bearing ring 44 and scraper ring 53. The structural unit is glued into the receptacle 18 in the embodiment of FIG. 6. In the embodiment of FIG. 6 it is not absolutely necessary to injection-mold the external ring 14 about the universal ball joint 15. External bearing ring can e.g. have slots in the axial direction in its half facing the housing interior, which slots extend from its front face 65 reaching into the interior of the housing 11 so that the universal ball joint 15 can be snapped into the outer bearing ring 44. Because the external ring 44 rests against receptacle 18, a reliable seat of the universal ball joint 15 is ensured.

Figure 7:
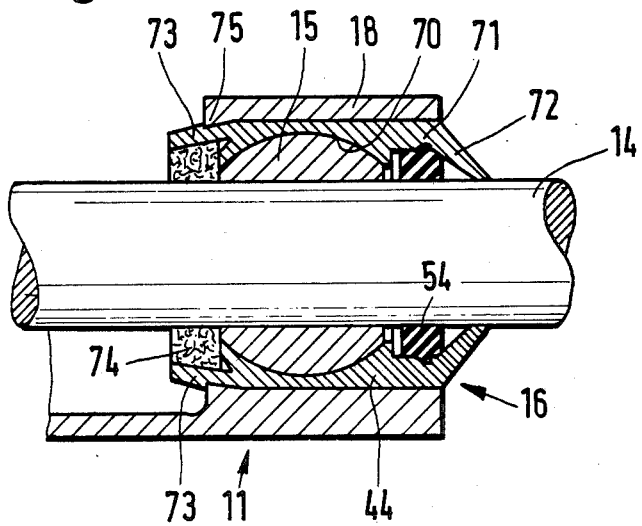
FIG. 7 shows an embodiment with an outer bearing ring consisting of two halves, holding a lubricating felt and a sealing ring and on which is formed a scraper ring as a single piece.

Bearing 16 of the embodiment according to FIG. 7 also has an external bearing ring 44 fitted in a receptacle 18 of a housing 11 and a universal ball joint as an internal bearing ring. The external bearing ring 44 is composed of two identical halves divided in the axial direction. These two halves are preferably interconnected via a film hinge and are injection-molded from plastic material in unfolded position relative to each other. This construction of the external bearing ring 44 permits simple forming of the receptacle 70 for the universal ball joint 15 and the receptacle 71 for the sealing ring 54. A scraper ring 72 can also be easily formed on the external ring 44 as a single piece. Locking spring 73 are formed on the side of the external ring 44 which is opposite to the scraper ring 72 relative to the universal ball joint 15. Locking springs 73 point axially into the interior of the housing. With locking springs 73 in their relaxed condition the inner sides of these locking springs facing the piston 14 extend parallel to piston 14. When the structural unit is mounted the universal ball joint 15, the sealing ring 54 and the lubricating felt 74 are at first inserted in one half of the external ring 44. Thereafter the second half is added and folded over the inserted parts. The lubricating felt could also be axially inserted in the external ring now.

Housing 11 has a circumferential locking stud 75 for fastening the entire structural unit in the housing. During the assembly the locking springs 73 of the external ring 44 engage behind this locking stud. Locking springs 73 and locking stud 75 are adapted to each other in such a way that after the insertion of the structural unit the locking springs are additionally tensioned by the locking stud, so that now their inner surfaces facing the axis of the piston 14 are inclined towards this axis. An undercut is thereby formed, through which the lubricating felt 74 is firmly held on the external ring 44 in the axial direction.

What is claimed is:

1. A reciprocating wiper system for motor vehicles comprising:
    a housing;
    a bearing seated in a first receptacle of said housing;
    a piston linearly displaceably guided in said housing and mounted in said bearing;
    a sealing ring and/or a scraping ring for said piston jointly mounted with said bearing in said housing as a single structural unit, wherein:
    said bearing has an inner bearing ring and an outer bearing ring, said outer bearing ring consisting of plastics material, said outer bearing ring being seated in the housing.

2. A wiper system in accordance with claim 1, wherein: said outer bearing ring is injection-molded about said inner bearing ring.

3. A wiper system in accordance with claim 1, wherein one of said inner or outer bearing rings has an axially extending collar for holding said sealing ring and/or said scraper ring.

4. A wiper system in accordance with claim 3, wherein: an inner or an outer sealing ring is positioned between said collar and said piston.

5. A reciprocating wiper system for motor vehicle comprising:
    a housing;
    a bearing seated in a first receptacle of said housing;
    a piston linearly displaceably guided in said housing and mounted in said bearing;
    a sealing ring and/or a scraping ring for said piston jointly mounted with said bearing in said housing as a single structural unit,
    wherein: said bearing has an inner bearing ring and an outer bearing ring, said outer bearing ring consisting of plastics material, said outer bearing ring being seated in the housing, and wherein:

said first receptacle is cone shaped and narrows towards the interior of said housing; and
said outer bearing ring has a corresponding conical form.

6. A reciprocating wiper system for motor vehicles comprising:
a housing;
a bearing seated in a first receptacle of said housing;
a piston linearly displaceably guided in said housing and mounted in said bearing;
a sealing ring and/or a scraping ring for said piston jointly mounted with said bearing in said housing as a single structural unit, wherein:
said bearing has an inner bearing ring and an outer bearing ring, said outer bearing ring consisting of plastics material, said outer bearing ring being seated in the housing, and wherein:
said outer bearing ring is glued into said first receptacle.

* * * * *